(12) United States Patent
David et al.

(10) Patent No.: US 7,586,584 B2
(45) Date of Patent: Sep. 8, 2009

(54) DETERMINATION OF RANGE TO A COHERENT LIGHT SOURCE USING LASER SPECKLE PATTERN

(75) Inventors: Ofer David, Haifa (IL); David Hornstein, Azor (IL)

(73) Assignee: Elbit Systems Ltd., Haifa (IL)

( * ) Notice: Subject to any disclaimer, the term of this patent is extended or adjusted under 35 U.S.C. 154(b) by 326 days.

(21) Appl. No.: 11/667,638

(22) PCT Filed: Nov. 10, 2005

(86) PCT No.: PCT/IL2005/001188

§ 371 (c)(1), (2), (4) Date: May 11, 2007

(87) PCT Pub. No.: WO2006/051541

PCT Pub. Date: May 18, 2006

(65) Prior Publication Data

US 2008/0111986 A1     May 15, 2008

(30) Foreign Application Priority Data

Nov. 11, 2004 (IL) .................................. 165167

(51) Int. Cl.
*G01C 3/08* (2006.01)
(52) U.S. Cl. ..................... 356/4.01; 356/512
(58) Field of Classification Search ................ 356/3.13, 356/4.01, 499, 512
See application file for complete search history.

(56) References Cited

U.S. PATENT DOCUMENTS

| | | | | |
|---|---|---|---|---|
| 3,824,018 A | * | 7/1974 | Crane, Jr. ..................... | 356/519 |
| 4,515,478 A | * | 5/1985 | Ballard et al. ................ | 356/519 |
| 4,735,507 A | * | 4/1988 | Crane et al. ................. | 356/491 |
| 5,151,585 A | * | 9/1992 | Siebert ..................... | 250/201.9 |
| 5,245,408 A | * | 9/1993 | Cohen ........................ | 356/491 |
| 5,257,090 A | | 10/1993 | Meinzer et al. | |
| 5,956,106 A | | 9/1999 | Petersen et al. | |
| 6,111,644 A | * | 8/2000 | Ballard ....................... | 356/454 |
| 6,151,114 A | | 11/2000 | Russell et al. | |
| 2003/0234349 A1 | | 12/2003 | Wootton et al. | |

(Continued)

FOREIGN PATENT DOCUMENTS

WO     WO 2004/075040 A     9/2004

OTHER PUBLICATIONS

International Search Report for PCT/IL2005/001188 (4 pages).

(Continued)

*Primary Examiner*—Isam Alsomiri
(74) *Attorney, Agent, or Firm*—Steven M. Jensen; Edwards Angell Palmer & Dodge LLP

(57) ABSTRACT

Apparatus for determining a range to a coherent light source emitting a coherent light beam, the apparatus including an image sensor and a processor, the processor being coupled with the image sensor, the image sensor including an imaging plane, for capturing an image of the wave front of the coherent light beam, the image including at least one light speckle, wherein the processor identifies the light speckle on the captured image, determines the characteristic diameter of the identified light speckle, and determines the range by squaring the characteristic diameter and dividing the result of the squaring by the wavelength of the coherent light beam and by a proportionality constant.

14 Claims, 3 Drawing Sheets

U.S. PATENT DOCUMENTS

2004/0118919 A1 6/2004 Breytman et al.
2006/0007423 A1* 1/2006 Guruprasad ................ 356/5.09

OTHER PUBLICATIONS

Written Opinion of the International Searching Authority for PCT/IL2005/001188 (5 pages).

Abstract of "Laser Threat Warning" Coleman C.I., Jun. 24, 1986, Microwave Exhibitions & Publishers, Turnbridge Wells, UK, XP009064635 (1 page).

* cited by examiner

DETERMINATION OF RANGE TO A COHERENT LIGHT SOURCE USING LASER SPECKLE PATTERN

CROSS-REFERENCE TO RELATED APPLICATIONS

This is a national stage filing which is based on and claims priority to and the benefit of International Application Number PCT/IL2005/001188 which itself is based on and claims priority to and the benefit of IL Patent Application Number 165167. International Application Number PCT/IL2005/001188 was filed on Nov. 10, 2005, and it was published as International Publication Number WO 2006/051541 A1 on May 18, 2006. IL Patent Application Number 165167 was filed on Nov. 11, 2004. The entirety of each of these applications is incorporated herein by reference.

FIELD OF THE DISCLOSED TECHNIQUE

The disclosed technique relates to laser range detection in general, and to methods and systems for determining the range to a laser source directly from the laser source itself, in particular.

BACKGROUND OF THE DISCLOSED TECHNIQUE

Laser range finders (herein abbreviated LRF) are devices that can determine the range from an LRF device to a target without having to physically measure the distance between the two. LRF devices thus provide a quick means, on the order of nanoseconds, for determining the distance between a system, equipped with an LRF device, and a target. Knowing the distance between a system and a target, quickly, can aid tanks and fighter planes in destroying enemy targets by providing distance to target measurements that accurately determine the type of weapon to use on a target and its angle of launch.

Known in the art of laser range detection is the method of time-of-flight measuring. This method is commonly used in LRF devices for determining the distance between a system, equipped with an LRF device, and a target. The time-of-flight measuring method works as follows. A system, equipped with an LRF device, emits laser radiation towards a target. Some of the radiation impinging upon the target will be reflected back towards the system. The time it takes for the emitted laser radiation to impinge upon the target and reflect back towards the system is measured. The speed at which the emitted laser radiation propagated towards the target and reflected back to the system is known, since laser radiation is a form of electromagnetic radiation, and all electromagnetic radiation essentially travels at the speed of light. With knowledge of the speed of propagation of the emitted laser radiation, and the amount of time the emitted laser radiation traveled from the system to the target and back to the system, the distance between the system and the target can be determined, as is known in the art.

It is noted that the time-of-flight measuring method requires a system, utilizing the method, to provide a laser pulse towards a target and to receive reflections of the laser pulse from the target. Systems utilizing the time-of-flight method are therefore susceptible to being detected by laser detector systems.

LRF systems and methods using the time-of-flight measuring method are common in the art. U.S. Pat. No. 5,870,180 issued to Wangler, and entitled "Time measurement device and method useful in a laser range camera" is directed to a device and a method for determining the range at which a target is located. The device includes a light transmitter for transmitting light during a time interval to be measured, and a light receiver for receiving the transmitted light. The light transmitter includes a light emitting diode, to which an electrical current is provided, for generating a constant output light source for the light transmitter. The light transmitter is also responsive to start and stop signals. The light receiver includes charged coupled devices (CCD), each having a linear response to an amount of exposure to light received from the light transmitter.

The range at which a target is located is determined by transmitting light, using the light transmitter, towards a target. Light is transmitted for a time period between the start and stop signals. Light transmitted towards a target is reflected back from the target to the receiver. The receiver receives the reflected light from the target, and provides an output signal, related to an amount of exposure to the reflected light during the time period between the start and stop signals, to the transmitter. The output signal thus provides a measurement of the time period between the start and the stop signals. The time period can be used to determine the range at which the target is located at.

U.S. Pat. No. 6,023,322 issued to Bamberger, and entitled "Laser range finder with target quality display and scan mode" is directed to a device for determining the range at which a target is located. The device includes a laser transmitting section, a laser receiving section and a microcontroller. The device also includes a circular in-sight field of view which incorporates within it a magnified "TV view" of the target area. Above and below the TV view are indicators which include a target quality indicator, a target range display and a sensitivity mode indicator. Within the TV view is an aiming reticle which roughly indicates the footprint of the laser pulses emitted by the device for range finding, such that a target can reliably be selected.

The device emits a series of laser pulses from its laser transmitting section. The device times the flight time of each pulse from the device to a target and back to its receiving section. An average flight time for the pulse series is calculated to determine the range to the target. The microcontroller uses a pulse stack and a comparator to detect and identify valid pulse returns and the number of pulse returns. By aiming the device at various targets using the reticle, a user can move the device around the target to find a surface proximate to the target with a reflective quality sufficient to yield an accurate reading.

U.S. Pat. No. 5,969,676 issued to Tran et al., and entitled "Radio frequency interferometer and laser rangefinder/designator base targeting system" is directed to an apparatus for passively detecting and locating sources of radio frequency (RF) signals from a moving vehicle and for determining the range from the moving vehicle to the RF sources. The apparatus works as follows. RF emissions from an RF source are received by two linear radio frequency interferometer (RFI) arrays located on a common geometric plane on a moving vehicle. Each RFI array produces a signal, indicative of the angle of arrival of the RF signals emitting from the source, with respect to its particular array. The signals from the RFI arrays are used to generate an output signal representative of the position, in terms of latitude, longitude and horizontal range, to the RF source. With the two linear RFI arrays, a line-of-sight vector can be determined, and other systems, such as a digital terrain elevation database (DTED) or a laser rangefinder/designator (LARD), can be provided with this information in order to provide further details of the position of the RF source.

The LARD determines the range to the RF source by directing a laser beam at the RF source. Reflected beams from the RF source are received by the LARD and analyzed by it. The result of the analysis is used to determine a precise range to the RF source. The range calculated by the LARD can be used to further correlate the RF source location with the line-of-sight vector determined by the two linear RFI arrays, and by other systems, such as a DTED.

SUMMARY OF THE DISCLOSED TECHNIQUE

It is an object of the disclosed technique to provide a novel method and system for determining the distance between a laser range detector and a laser source by processing a captured image of the laser source wave front.

In accordance with the disclosed technique, there is thus provided an apparatus for determining a range to a coherent light source emitting a coherent light beam. The apparatus includes an image sensor and a processor coupled with the image sensor. The image sensor includes an imaging plane for capturing an image of the wave front of the coherent light beam. The image of the wave front includes at least one light speckle. The processor identifies the light speckle on the captured image and determines the characteristic diameter of the identified light speckle. The processor determines the range by squaring the characteristic diameter and dividing the result of the squaring by the wavelength of the coherent light beam and by a proportionality constant.

According to another aspect of the disclosed technique, there is thus provided a method for determining a range to a coherent light source emitting a coherent light beam. The method includes the procedure of capturing an image of the wave front of the coherent light beam on a plane, wherein the captured image is characterized by having at least one light speckle. The method further includes the procedures of identifying the light speckle on the captured image, determining a characteristic diameter of the identified light speckle, and determining the range by squaring the characteristic diameter and dividing a result of the squaring by the wavelength of the coherent light beam and by a proportionality constant.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and method for determining the distance between a laser range detector (herein abbreviated LRD) and a laser source by processing a captured image of the laser source wave front. According to the disclosed technique, an LRD system can determine the distance between a system, mounted with an LRD, and a laser source, without having to provide a laser pulse towards the laser source and receive reflections from the laser source. The disclosed technique thereby provides a passive system and method for range determination to a laser source that is essentially undetectable by laser detection systems.

Figure 1:
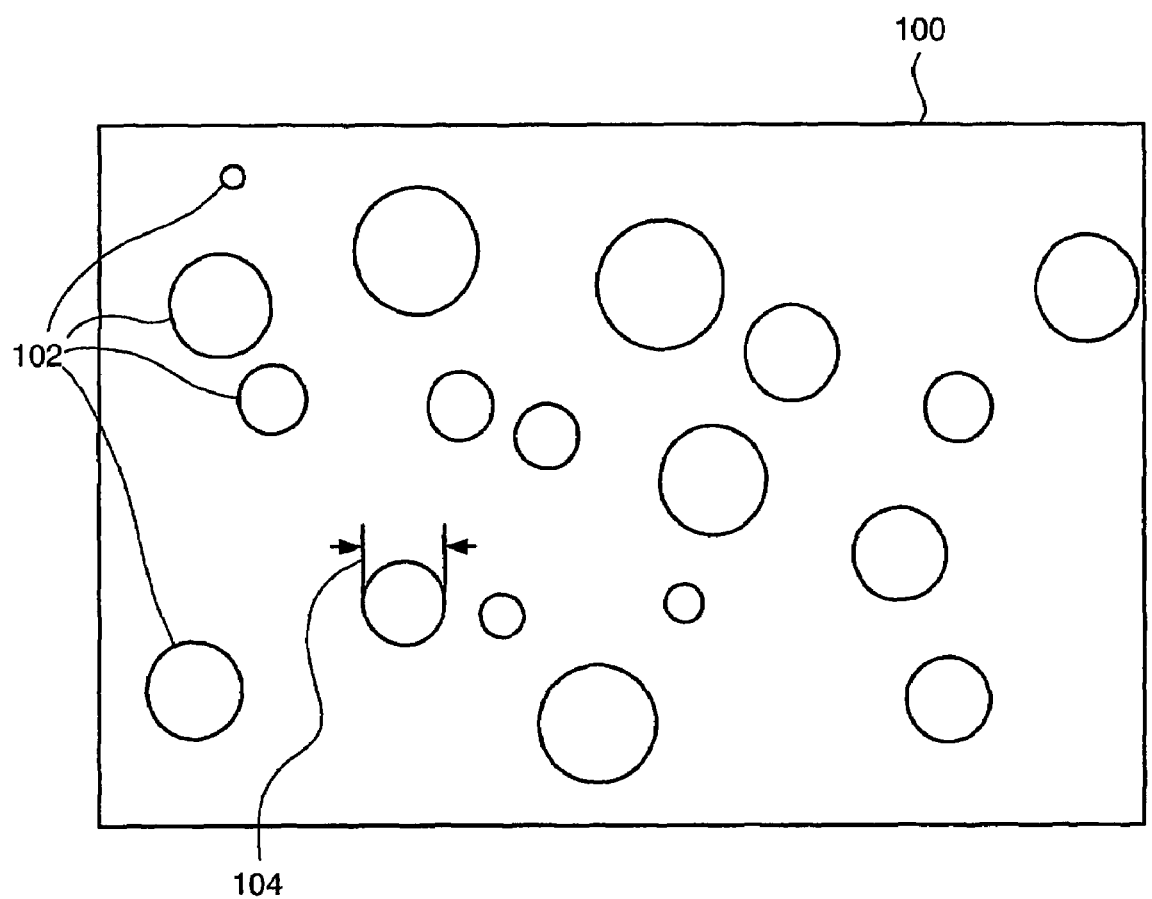
FIG. 1 is a schematic illustration of a speckle pattern, constructed and operative in accordance with an embodiment of the disclosed technique.

Lasers provide light that is coherent. When coherent light falls on a plane, a speckled pattern of light appears to a viewer. This speckled pattern is unexpected because coherent light emerging from a laser emerges as essentially a perfectly straight line. The speckled pattern is caused by interference on a viewing plane, such as the retina of the eye or an image plane of a camera, by coherent light interfering with particles found in the medium the light is traveling through. Reference is now made to FIG. 1, which is a schematic illustration of a speckle pattern, constructed and operative in accordance with an embodiment of the disclosed technique. The illustration of FIG. 1 includes viewing plane 100, which can be an image plane of a camera. Viewing plane 100 is constructed to form an image when light hits its surface, much like the retina of the eye forms an image when light hits its surface. Viewing plane 100 depicts a speckle pattern captured from laser light impinging on its surface. Viewing plane 100 includes speckles 102, which are imprints of the interference between coherent light and particles found in the medium the light is traveling through. Speckles 102 are each of different sizes but can be characterized by their average diameter 104.

The average diameter of a speckle captured on an image plane, designated as $D_S$, is proportional to the distance between the image plane on which the diameter of the speckle was measured and the source of the laser light which caused the speckle pattern on the image plane, designated as R. $D_S$ can be equated approximately to R by the following equation:

$$D_S \approx \sqrt{\lambda \cdot R} \qquad (1)$$

where $\lambda$ is the wavelength of the laser light. Equation (1) is known in the art. $D_S$ can be equated exactly to R by adding a proportionality constant, k, to Equation (1), and can be written as:

$$D_S = k_1 \sqrt{\lambda \cdot R} \qquad (2)$$

where $k_1$ can depend on at least one of the following: the relative humidity RH, the temperature T, the atmospheric transmittance $\gamma$, and the refractive index structure constant $C_n^2$ (a parameter used to describe the strength of atmospheric turbulence) of the medium in which the light is traveling through, as well as the height, measured from sea level, at which the light is traveling at. The value of $k_1$ can be determined experimentally. Equation (2) can equivalently be written as:

$$R = \frac{D_S^2}{k_2 \lambda} \qquad (3)$$

where $k_2$ is equal to the square of $k_1$. Equation (3) states that R, the distance between the image plane and the source of the laser light, can be determined by squaring the average diameter of the speckles captured on the image plane and dividing the result by $\lambda$, the wavelength of the laser light, and a proportionality constant, $k_2$.

Figure 2:
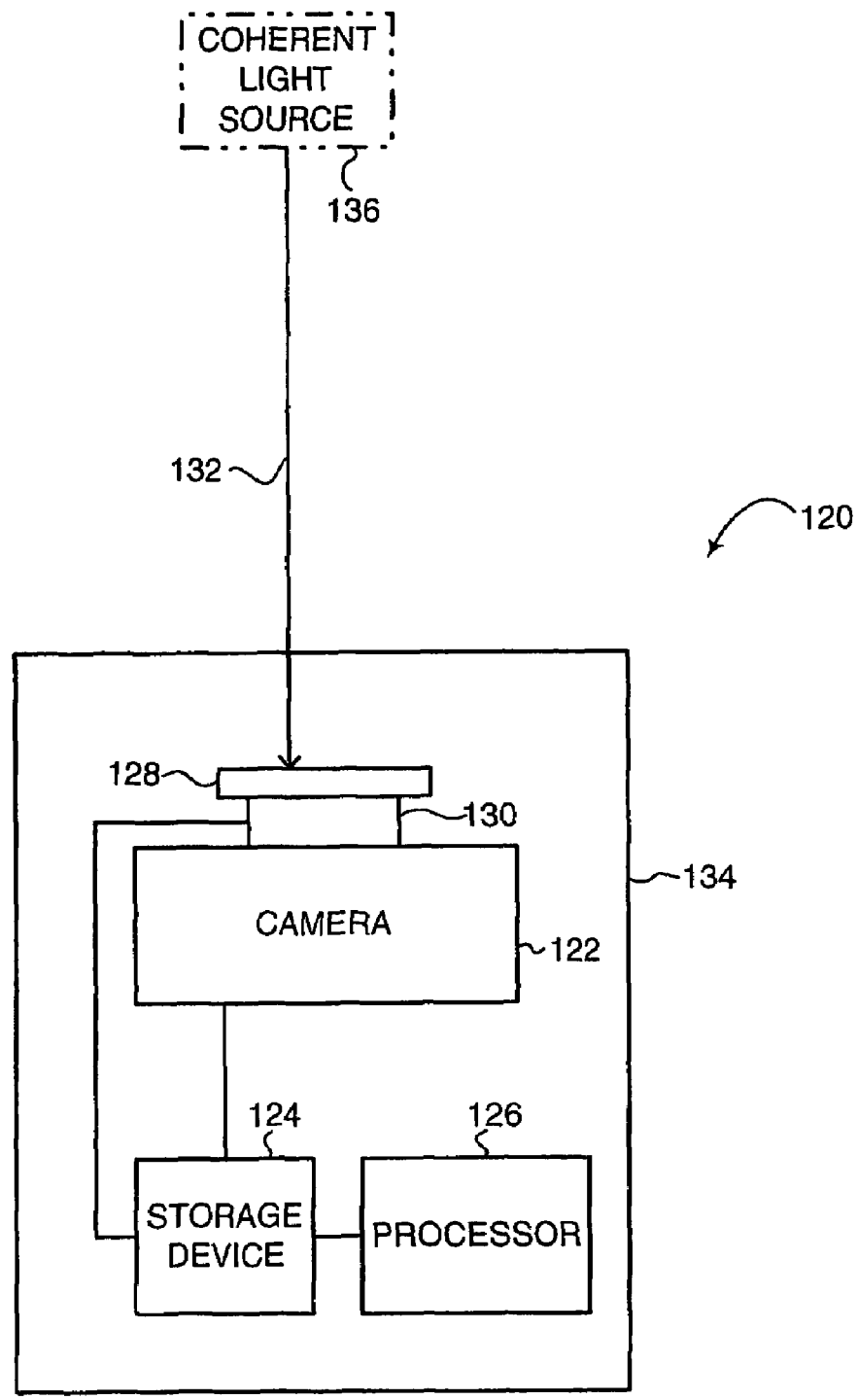
FIG. 2 is a schematic illustration of a system, constructed and operative in accordance with an embodiment of the disclosed technique.

Reference is now made to FIG. 2, which is a schematic illustration of a system, generally referenced 120, constructed and operative in accordance with an embodiment of the disclosed technique. System 120 includes a camera 122, a storage unit 124, a processor 126, a filter 128, a wavelength detector 130 and housing 134. Camera 122 can be an image sensor. Storage unit 124 is coupled with camera 122, wavelength detector 130 and processor 126. Filter 128 and wavelength detector 130 are both located in front of camera 122, centered over an aperture of camera 122 (not shown). Camera 122, storage unit 124, processor 126, filter 128 and wavelength detector 130 are packaged inside housing 134. Filter 128 can be a light polarizer, a wavelength filter, and the like. Filter 128 selectively allows light of specified wavelengths to enter camera 122. In another embodiment, system 120 includes a light guide (not shown), located in front of camera 122, which guides light impinging on system 120 towards camera 122.

Light 132 arriving from coherent light source 136 enters system 120 and falls incident on filter 128. It is noted that coherent light source 136 can be, for example, a laser. Filter 128 selectively allows light 132 to enter system 120. For example, filter 128 can be constructed to allow only light of wavelengths common to laser sources associated with military vehicles, to enter system 120. Light which enters system 120 via filter 128 is directed towards wavelength detector 130. Wavelength detector 130 detects the wavelength of light 132, and provides the detected wavelength to storage unit 124. Wavelength detector 130 further directs light 132 towards camera 122. In an embodiment of the disclosed technique, camera 122 captures an image of the wave front of light 132 falling directly incident on its image plane. Due to particles present in the medium in which the light travels in, the captured image of the wave front of light 132 will contain a speckle pattern. In another embodiment of the disclosed technique, an imaging plane (not shown) placed between system 120 and coherent light source 136 allows a speckle pattern to be seen, and camera 122 captures an image of the speckle pattern by photographing the imaging plane from in front of the imaging plane. In a further embodiment of the disclosed technique, a semi-transparent imaging plane (not shown) placed between system 120 and coherent light source 136 allows a speckle pattern to be seen from behind the imaging plane, and camera 122 captures an image of the speckle pattern by photographing the imaging plane from behind the imaging plane. Camera 122 provides the captured image to storage unit 124. Storage unit 124 provides the detected wavelength and the captured image to processor 126. Processor 126 detects and identifies speckles on the captured image. Once the speckles have been detected and identified, processor 126 measures the diameters of all the detected and identified speckles. Processor 126 then determines a characteristic diameter for the detected and identified speckles on the captured image, for example by statistical averaging, or by selecting speckles which conform to predetermined criteria. Processor 126 also determines a value for the proportionality constant used in Equation (3). Processor 126 finally uses Equation (3), the detected wavelength, the proportionality constant and the characteristic diameter obtained from the captured image to determine the range between system 120 and coherent light source 136.

Figure 3:
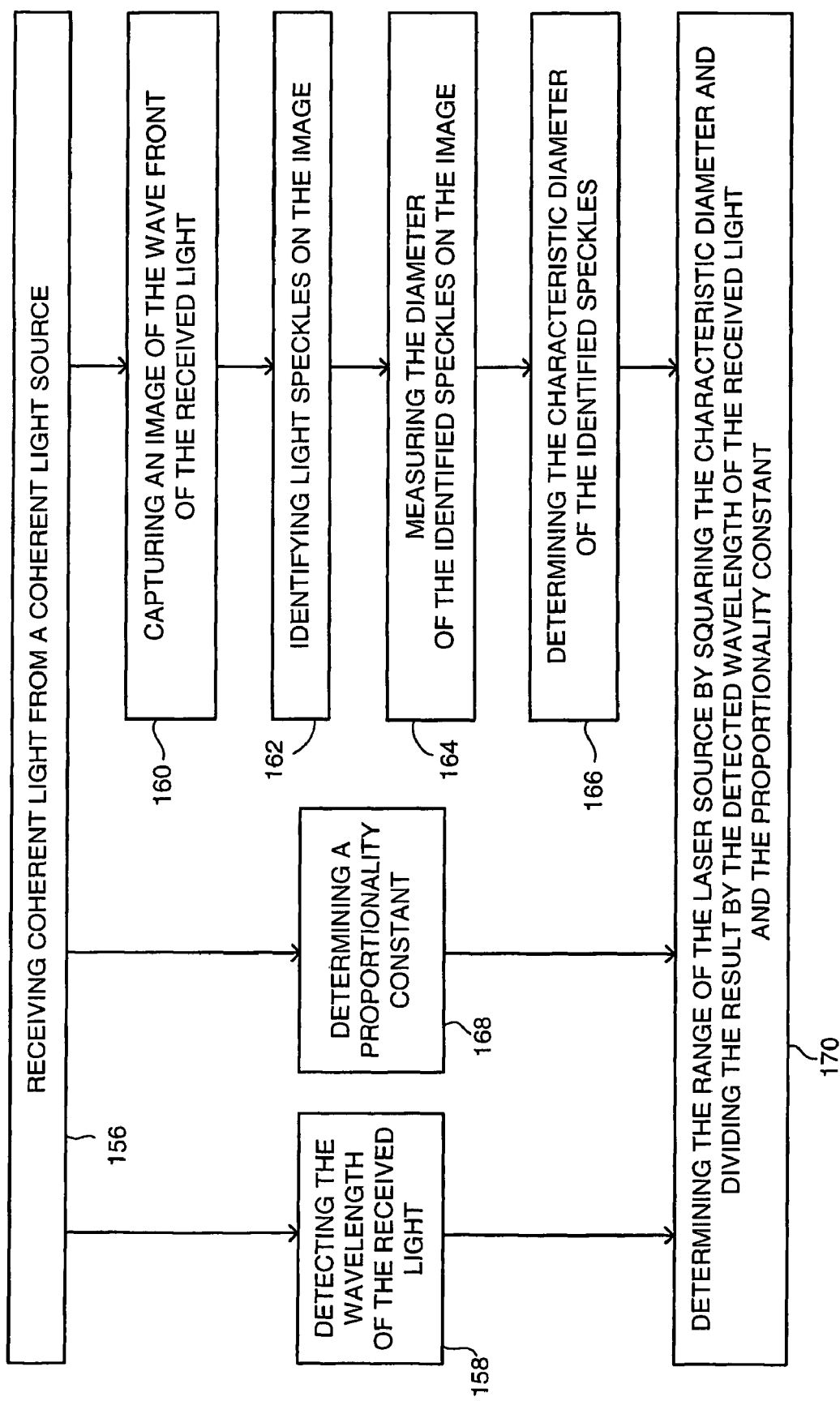
FIG. 3 is a block diagram describing a method, operative in accordance with an embodiment of the disclosed technique.

Reference is now made to FIG. 3, which is a schematic illustration of a method operative in accordance with an embodiment of the disclosed technique. In procedure 156 incoming coherent light is received from a coherent light source, for example, a laser. With reference to FIG. 2, filter 128 selectively allows light 132 to enter system 120, and a light guide (not shown) guides light 132 to camera 122.

In procedure 158, the wavelength of the incoming light is detected and stored. With reference to FIG. 2, a light guide (not shown) guides light 132 to wavelength detector 130. Wavelength detector 130 detects the wavelength of light 132, and provides the detected wavelength to storage unit 124. Procedure 158 can be executed concurrently with procedures 160 to 168.

In procedure 160, an image of the wave front of the incoming light is captured on an image plane. Since the incoming light is coherent and propagates through a medium containing particles (unless the medium was pure vacuum), a speckle pattern will appear on the captured image. With reference to FIG. 2, camera 122 captures an image of the wave front of light 132 falling incident on its image plane.

In procedure 162, light speckles are detected and identified on the captured image. With reference to FIG. 2, camera 122 provides the captured image to storage unit 124. Storage unit 124 provides the captured image to processor 126. Processor 126 detects and identifies speckles on the captured image.

In procedure 164, the diameters of the detected and identified speckles are measured and stored. With reference to FIG. 2, processor 126 measures the diameters of the detected and identified speckles.

In procedure 166, a characteristic diameter of the detected and identified speckles is determined by the diameters of the measured speckles, the result of which is stored. Determination of the characteristic diameter can be achieved by using, for example, the statistical average, or by selecting speckles which conform to predetermined criteria. With reference to FIG. 2, processor 126 determines a characteristic diameter for the detected and identified speckles on the captured image.

In procedure 168, the proportionality constant of Equation (3) is determined. The proportionality constant can depend on at least one of the following: the relative humidity RH, the temperature T, the atmospheric transmittance $\gamma$, and the refractive index structure constant $C_n^2$ (a parameter used to describe the strength of atmospheric turbulence) of the medium in which the light is traveling through, as well as the height, measured from sea level, at which the light is traveling at. The value of the proportionality constant can be determined experimentally. With reference to FIG. 2, processor 126 determines a value for the proportionality constant used in Equation (3).

In procedure 170, the range from the laser source to the image plane is calculated by squaring the determined characteristic speckle diameter and dividing the result by the wavelength of the incoming light and the determined proportionality constant. With reference to FIG. 2, processor 126 uses Equation (3), the detected wavelength, the proportionality constant and the characteristic diameter obtained from the captured image to determine the range between system 120 and coherent light source 136.

It will be appreciated by persons skilled in the art that the disclosed technique is not limited to what has been particularly shown and described hereinabove. Rather the scope of the disclosed technique is defined only by the claims, which follow.

The invention claimed is:

1. Apparatus for determining a range to a coherent light source emitting a coherent light beam, the apparatus comprising:
    an image sensor, including an imaging plane, for capturing an image of the wave front of said coherent light beam, said image comprising at least one light speckle; and
    a processor, coupled with said image sensor,
    wherein said processor identifies said at least one light speckle on said captured image,
    wherein said processor determines the characteristic diameter of said identified at least one light speckle, and
    wherein said processor determines said range by squaring said characteristic diameter and dividing the result of said squaring by the wavelength of said coherent light beam and by a proportionality is constant.

2. The apparatus according to claim 1, further comprising a wavelength detector, wherein said wavelength detector detects the wavelength of said coherent light beam.

3. The apparatus according to claim 2, further comprising a storage unit, said storage unit coupled with said image sensor and said wavelength detector, wherein said storage unit stores said detected wavelength and said captured image.

4. The apparatus according to claim 1, further comprising a filter, optically coupled between said coherent light source and said image sensor, wherein said filter selectively allows said coherent light into said apparatus.

5. The apparatus according to claim 1, further comprising a light guide, wherein said light guide guides said coherent light from an entrance point into said apparatus towards said image sensor.

6. The apparatus according to claim 1, wherein said processor determines the characteristic diameter of said identified at least one light speckle by statistical averaging.

7. The apparatus according to claim 1, wherein said processor determines said proportionality constant.

8. Method for determining a range to a coherent light source emitting a coherent light beam, the method comprising the procedures of:

capturing an image of the wave front of said coherent light beam on a plane, said captured image characterized by having at least one light speckle;

identifying said at least one light speckle on said captured image;

determining a characteristic diameter of said at least one identified light speckle; and determining said range by squaring said characteristic diameter and dividing a result of said squaring by the wavelength of said coherent light beam and by a proportionality constant.

9. The method according to claim 8, further comprising the procedure of detecting a wavelength of said coherent light beam.

10. The method according to claim 9, further comprising the procedure of storing said detected wavelength and said captured image in a storage unit.

11. The method according to claim 8, further comprising the procedure of filtering said coherent light beam, wherein said filtering selectively allows said coherent light beam to be captured in said image.

12. The method according to claim 8, further comprising the procedure of guiding said coherent light beam.

13. The method according to claim 8, wherein said procedure of determining said characteristic diameter is achieved by statistical averaging.

14. The method according to claim 8, further comprising the procedure of determining said proportionality constant.

* * * * *